United States Patent
Chen et al.

(10) Patent No.: US 8,060,649 B2
(45) Date of Patent: Nov. 15, 2011

(54) METHOD AND SYSTEM FOR DYNAMIC METRIC AND WIRELESS HELLO PROTOCOL

(75) Inventors: Song Ching Chen, Los Altos, CA (US); Fuyong Zhao, San Jose, CA (US)

(73) Assignee: Aruba Networks Cayman, Grand Cayman (KY)

( * ) Notice: Subject to any disclaimer, the term of this patent is extended or adjusted under 35 U.S.C. 154(b) by 0 days.

(21) Appl. No.: 11/768,788

(22) Filed: Jun. 26, 2007

(65) Prior Publication Data

US 2009/0003366 A1  Jan. 1, 2009

(51) Int. Cl.
*G06F 15/173* (2006.01)
*G06F 15/16* (2006.01)

(52) U.S. Cl. ..................................... 709/238; 709/232

(58) Field of Classification Search ............ 709/238
See application file for complete search history.

(56) References Cited

U.S. PATENT DOCUMENTS

| | | | |
|---|---|---|---|
| 5,596,722 A * | 1/1997 | Rahnema | 709/241 |
| 5,774,497 A * | 6/1998 | Block et al. | 375/226 |
| 5,883,924 A * | 3/1999 | Siu et al. | 375/226 |
| 6,456,600 B1 * | 9/2002 | Rochberger et al. | 370/255 |
| 6,982,962 B1 * | 1/2006 | Lunsford et al. | 370/278 |
| 2005/0163059 A1 * | 7/2005 | Dacosta et al. | 370/252 |
| 2005/0267985 A1 * | 12/2005 | Ji et al. | 709/238 |
| 2006/0100791 A1 * | 5/2006 | Cheng | 702/20 |
| 2006/0215583 A1 * | 9/2006 | Castagnoli | 370/254 |
| 2007/0002748 A1 * | 1/2007 | Nakata et al. | 370/238 |
| 2007/0147537 A1 * | 6/2007 | Lee et al. | 375/267 |
| 2007/0223451 A1 | 9/2007 | Ren et al. | |
| 2007/0291689 A1 | 12/2007 | Kapur et al. | |
| 2008/0082933 A1 * | 4/2008 | Howard et al. | 715/771 |
| 2008/0107069 A1 * | 5/2008 | Wu et al. | 370/329 |

FOREIGN PATENT DOCUMENTS

WO  PCT/US07/72781  10/2008

\* cited by examiner

*Primary Examiner* — Jeffrey Pwu
*Assistant Examiner* — Shaq Taha
(74) *Attorney, Agent, or Firm* — Blakely, Sokoloff, Taylor & Zafman LLP

(57) ABSTRACT

A method and system for a dynamic metric and wireless hello protocol for use in a wireless mesh network are disclosed. In one embodiment a computer-implemented method, comprises determining a route for a packet to travel through a mesh network. A first time period needed to transmit the packet between a first node and a second node in the mesh network is estimated. The first time period is normalized to generate a normalized value. A route is calculated using the normalized value.

13 Claims, 7 Drawing Sheets

300

400

| Name | Value |
|---|---|
| 1_WAY_NBR | 1 |
| 2_WAY_NBR | 2 |
| INIT_NBR | 3 |
| ETX | 4 |
| PKTPAIR_1 | 5 |
| PKTPAIR_2 | 6 |
| PKTPAIR_R | 7 |

500

600

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|               2               |            4 * n              |
+-+-+-+-+-+-+-+-+-+-+-+-+-+-+-+-+-+-+-+-+-+-+-+-+-+-+-+-+-+-+-+-+
|                        Neighbor address                       |
+-+-+-+-+-+-+-+-+-+-+-+-+-+-+-+-+-+-+-+-+-+-+-+-+-+-+-+-+-+-+-+-+
-                        Neighbor address                       -
+-+-+-+-+-+-+-+-+-+-+-+-+-+-+-+-+-+-+-+-+-+-+-+-+-+-+-+-+-+-+-+-+
```

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|               3               |            4 * n              |
+-+-+-+-+-+-+-+-+-+-+-+-+-+-+-+-+-+-+-+-+-+-+-+-+-+-+-+-+-+-+-+-+
|                        Neighbor address                       |
+-+-+-+-+-+-+-+-+-+-+-+-+-+-+-+-+-+-+-+-+-+-+-+-+-+-+-+-+-+-+-+-+
-                        Neighbor address                       -
+-+-+-+-+-+-+-+-+-+-+-+-+-+-+-+-+-+-+-+-+-+-+-+-+-+-+-+-+-+-+-+-+
```

METHOD AND SYSTEM FOR DYNAMIC METRIC AND WIRELESS HELLO PROTOCOL

FIELD OF THE INVENTION

The field of the invention relates generally to wireless networks and more particularly relates to a method and system for a dynamic metric and wireless hello protocol for use in a wireless mesh network.

BACKGROUND

With recent technological advancements in computer and wireless communications, mobile wireless computing has seen increasingly widespread use and application. Not constrained by wires, users with mobile computing devices can move around freely at their convenience, and may often need to communicate with each other in circumstances where there is no fixed infrastructure. In such cases, they can form a mobile ad hoc network (MANET) or mobile wireless mesh network. A mobile wireless mesh network is an autonomous system of wireless mobile routers (and associated hosts), which can move randomly and re-organize themselves into an arbitrary network without any underlying backbone and infrastructure.

Besides mobile wireless mesh networks, recently, interesting commercial applications of fixed wireless mesh networks have also emerged. One example of such a commercial application is "community wireless networks," which are used to provide broadband Internet access to communities that previously did not have such access. In these fixed "community wireless networks", each wireless router in the network not only provides Internet access for attached users but also becomes part of the network infrastructure and can route data through the wireless mesh network to its destination. A routed wireless mesh network is highly flexible and inherently fault-tolerant. It simplifies line-of-sight problems and extends the reach and coverage of the network with a minimal amount of network infrastructure and interconnection costs.

There are also hybrid wireless mesh networks where some mesh routers are mobile and the others are not. In whatever cases (whether mobile or fixed or hybrid), wireless mesh networks have some salient characteristics, such as: highly dynamic, autonomous, peer-to-peer, multi-hop, often limited bandwidth and computing power etc. The wireless mesh networks are highly dynamic for two reasons: First, the routers themselves may move (e.g. in mobile or hybrid wireless mesh networks), causing fast topological changes. Second, even if the routers themselves do not move (e.g. in fixed wireless mesh networks), the radio link qualities can change very quickly because of interference, geographical and environmental factors etc. The traditional routing protocols (e.g. OSPF, RIP), designed for wired infrastructures, can not handle such fast changes. Many of the ad hoc routing protocols (e.g. AODV), on the other hand, lack the ability to flexibly adapt to the radio link quality changes.

Routing protocols have traditionally focused on finding paths with minimum hop count. However, such paths can include slow or lossy links, leading to poor throughput. These lossy links are bad enough to impair packet forwarding performance, but not so bad as to prevent routing protocol from using these links to forward traffic.

SUMMARY

A method and system for a dynamic metric and wireless hello protocol for use in a wireless mesh network are disclosed. In one embodiment a computer-implemented method comprises determining a route for a packet to travel through a mesh network. A first time period needed to transmit the packet between a first node and a second node in the mesh network is estimated. The first time period is normalized to generate a normalized value. A route is calculated using the normalized value.

The above and other preferred features, including various novel details of implementation and combination of elements, will now be more particularly described with reference to the accompanying drawings and pointed out in the claims. It will be understood that the particular methods and systems described herein are shown by way of illustration only and not as limitations. As will be understood by those skilled in the art, the principles and features described herein may be employed in various and numerous embodiments without departing from the scope of the invention.

BRIEF DESCRIPTION OF THE DRAWINGS

The accompanying drawings, which are included as part of the present specification, illustrate the presently preferred embodiment of the present invention and together with the general description given above and the detailed description of the preferred embodiment given below serve to explain and teach the principles of the present invention.

FIG. 7 illustrates an exemplary 2-way Neighbor Reply packet 700, according to one embodiment of the present invention;

FIG. 8 illustrates an exemplary Initial Neighbor Request packet 800, according to one embodiment of the present invention;

DETAILED DESCRIPTION

Figure 1:
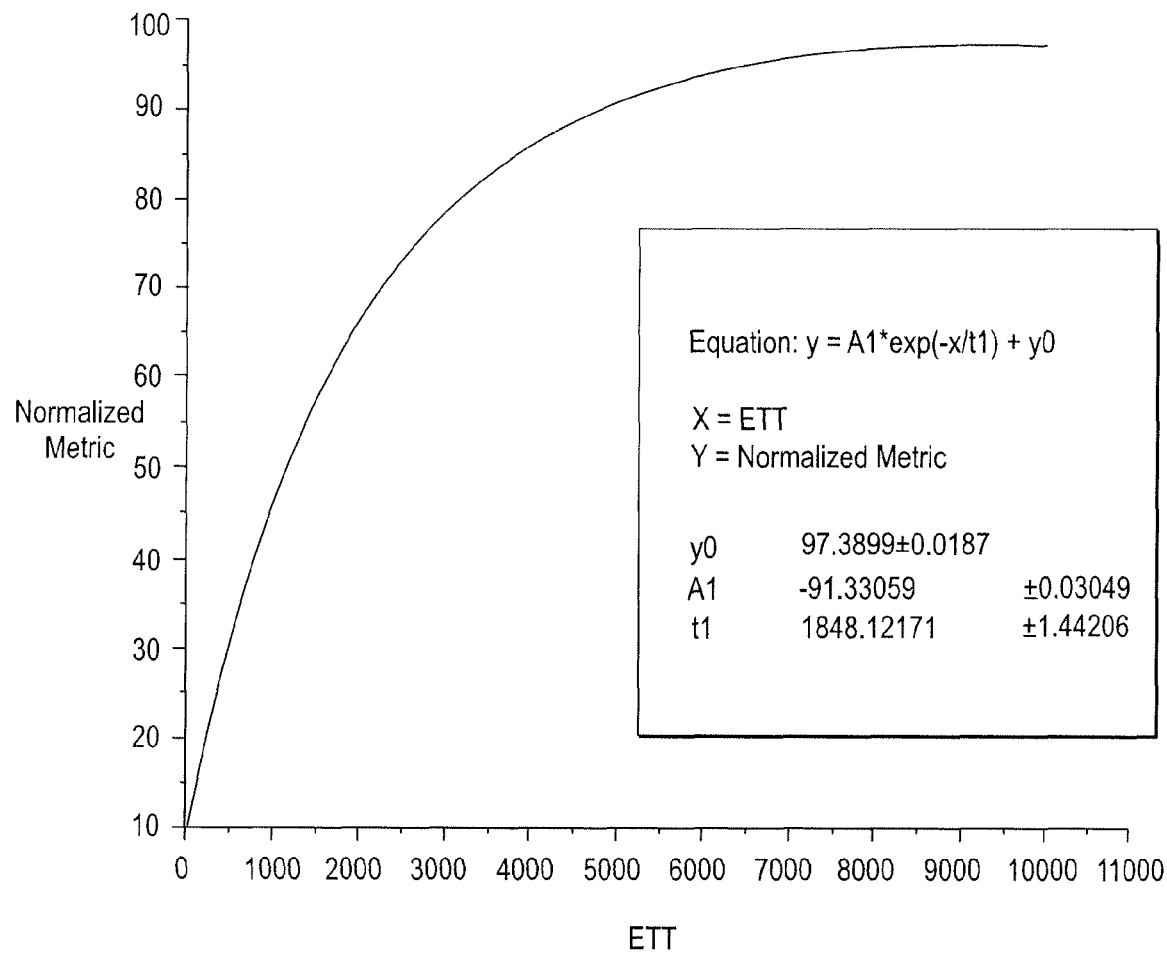
FIG. 1 is a graph illustrating the relationship between absolute values for expected transmission time (ETT) and normalized ETT values, a routing metric proposed for use in the present invention.

A method and system for dynamic metric and wireless hello protocol in a mesh network are disclosed. In one embodiment, the method comprises.

In the following description, for purposes of explanation, specific nomenclature is set forth to provide a thorough understanding of the various inventive concepts disclosed herein. However, it will be apparent to one skilled in the art that these specific details are not required in order to practice the various inventive concepts disclosed herein.

Some portions of the detailed descriptions that follow are presented in terms of wireless networks and computer systems. These wireless network descriptions and representations are the means used by those skilled in the wireless networking arts to most effectively convey the substance of their work to others skilled in the art. A wireless network is here, and generally, conceived to be a system for communications among two or more computers using radio waves as its carrier. Usually, though not necessarily, the information communicated between computer systems takes the form of packets. Furthermore, for reasons of common usage, the components of the packets are referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "router" or "radio" or "frequency" or "channel" or "backbone" or "packet" or "communicate" or the like, refer to the components, and actions and processes of a network, or similar communication system, that transfers data represented as physical (electronic) quantities within the computer system's registers and memories or other such information storage, transmission or display device from one computer system to another.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories, random access memories, EPROMs, EEPROMs, magnetic or optical cards, or any type of media suitable for storing electronic instructions, and each coupled to a computer system bus.

The methods presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will be apparent from the description below. In addition, the present invention is not described with reference to any particular programming language. It will be appreciated that a variety of programming languages may be used to implement the teachings of the invention as described herein.

Two link quality parameters are proposed for use as routing metrics, which in turn can be used for calculating the routing path for routing packets in a wireless mesh network. The first link quality parameter is a normalized expected transmission time ("normalized ETT"). Expected transmission times are "normalized" by regression analysis, reducing the volatility of absolute ETT values. The second parameter is a Combinational Weighted Link Metric where the impact of per hop loss ratio and link throughput is superimposed to decrease metric volatility even further. A wireless hello protocol is provided, which is integrated with an adaptive wireless routing ("AWR") protocol stack. The wireless hello protocol ("WHP") is configured to work in an unreliable network and facilitate functions such as dynamic metric calculation, metric reporting and neighbor adjacency maintenance.

Most existing wireless mesh network routing protocols select minimum hop-count paths. These paths tend to contain longer range links where packets need to be transmitted at the lowest transmission rate.

Prior wireless mesh networks consider the effects of packet losses on wireless links and use an expected transmission count metric (ETX), to find high throughput paths on multi-hop wireless networks. Links with higher loss rates require more retransmission to successfully transmit a packet and have higher values of ETX. Another prior system by Draves et al. utilizes a wireless node multi-radio and multi-channel with different transmission rates. They introduce the parameter of Expected Transmission Time (ETT), and explain the value of this parameter is a function of loss rate and bandwidth of the link. They also propose another routing metric, Weighted Cumulative ETT (WCETT), to consider intra-flow interference (the bandwidth of the links along a routing path that is consumed by a packet transmission).

The present system and method presents two routing metrics for use in a routing protocol in wireless mesh networks. The proposed routing metrics do not cause frequent route changes, ensuring the stability of the network. Second, the routing metrics capture the characteristics of a mesh network, ensuring the routing path has good performance (i.e., high throughput and low packet delay). Third, efficient algorithms can be used to calculate the routing path based on the routing metrics.

Route Stability

A routing metric can be either load-sensitive or topology-dependent. Under load-sensitive metrics, a route may change frequently as data packets arrive and depart at the router. On the other hand, topology-dependent metrics assign a routing path based on the topology of the path. Therefore, topology-dependent metrics are generally more stable.

Good Performance Path

To ensure that the resources of mesh networks are utilized efficiently, the routing path selected by the routing protocol has a good performance in terms of high throughput and low packet delay. There are at least four characteristics of mesh networks that impact the performance of path: path length, link capacity, packet loss ratio, and interference. We discuss each characteristic below.

Path Length

Each hop introduces extra delay and potentially more packet loss. Therefore, the present routing metric increases when the routing path length increases.

Link Capacity

In general, as the distance between two nodes increases, the channel quality degrades. Since the IEEE 802.11 standard provides that transmission rates adapt according to channel quality, the link capacity is reduced as the distance between nodes increases. Therefore, although the effect of path length seems to favor paths with smaller hop-count, the relationship between distance and link capacity counteracts this effect by favoring paths with larger hop-counts rather than links with higher capacity.

Packet transmission rates are related to distance between nodes as shown below:

| Distance(m) | | | | | | | | | | |
|---|---|---|---|---|---|---|---|---|---|---|
| 25 | 50 | 75 | 100 | 125 | 150 | 175 | 200 | 225 | 250 | >250 |
| Rate(Mbps) 54 | 48 | 36 | 24 | 18 | 12 | 9 | 6 | 2 | 1 | 0 |

Packet Loss Ratio

Different wireless links may have different packet loss ratios. A high packet loss ratio link affects both link throughput and delay. Hence, the present routing metric accommodates the effect of packet loss ratio to ensure the routing path has good performance.

Interference

The bandwidth of a wireless link is shared between neighboring nodes. A flow of data through a wireless link consumes not only the bandwidth of the links along the path (intra-flow interference), it also contends for bandwidth with links that are in the neighboring area of the path (inter-flow interference).

These types of interference increase the bandwidth consumption of the data flow at each of the links along the path. Interference also causes the throughput of the data flow to degrade sharply and the delay at each hop to increase dramatically as the hop-count of the path increases. The channel assignment impacts the interference level since neighboring nodes can use different channels so that they do not interfere with each other. The link capacity also impacts the interference level. A slower link consumes more channel time and, hence, results in more intra-flow and inter-flow interference. It is difficult to capture interference using routing metrics since both the diversity of channel assignments and the link capacity need to be considered along the length of the routing path.

Efficient Method for Routing Path Generation

Even if a routing metric ensures that the routing path has good performance, a routing protocol may not generate the routing path efficiently if there does not exist an efficient algorithm to calculate the routing path based on the routing metric.

Prior routing protocols essentially rely on two algorithms, Bellman-Ford or Dijkstra, to calculate routing path. Likewise, the present method and system is compatible with these algorithms. Further, the present method and system ensures that the order of paths are preserved if they are appended or prefixed by a common third path.

Prior Routing Metrics for Mesh Networks

Six routing metrics are presently used in mesh networks, and each has its disadvantages. These six routing metrics are: hop-count, per-hop round trip time ("RTT"), per-hop packet pair delay ("PktPair"), expected transmission count ("ETX"), expected transmission time ("ETT"), and weighted cumulative ETT ("WCETT"). These prior routing metrics are explained further below.

Hop-count (Hop)

The Hop-count metric is compatible with both the Bellman-Ford algorithm and the Dijkstra algorithm. However, hop-count does not take into account differences in packet transmission rates with distance between nodes, packet loss ratios, or interference in the mesh network. Hence, using the hop-count metric may not result in good performance because it tries to reduce the number of hops by considering long range or low quality links, where packets need to be transmitted at the lowest transmission rate.

Per-hop Round-trip Time (RTT)

RTT is used to estimate channel quality. A node sends a unicast probe packet carrying a timestamp to each of its neighbors every 500 milliseconds. Each neighbor immediately responds to the probe with a probe acknowledgement. This enables the sending node to measure the round-trip time to each of its neighbors. A weighted average value called Smoothed RTT ("SRTT") is introduced to estimate the quality of a link. SRTT may be described according to the equation below:

$$SRTT = \alpha RTT_{new} + (1-\alpha)SRTT$$

where α is a coefficient between 0 and 1.

Probe messages sent on a heavily-utilized channel are likely to take longer to gain access to the medium than probes sent on a lightly-used channel.

RTT accounts for link load, bandwidth and for link loss rate.

Per-hop Packet Pair Delay (PKTPAIR)

This metric is based on measuring the delay between a pair of back-to-back unicast probes sent from one node to a neighboring node. It is designed to correct the problem of distortion of RTT measurement due to queuing delay.

To calculate this metric, a node sends two probe packets back-to-back to each neighbor at a periodic interval, for example, every five seconds. The first probe packet size is small (for example, 100 bytes) and the next one is large (for example, 1800 bytes). The neighboring node calculates the delay between the receipt of the first and the second probe packets. It then reports this delay back to the sending node.

This metric is not affected by queuing delay at the sending node since both packets in a pair are delayed equally. This metric accounts for link load and bandwidth. It also accounts for link loss rate.

Expected Transmission Count (ETX)

ETX is defined as the expected number of MAC layer transmissions that is needed to successfully deliver a packet through a wireless link. The ETX of a path is defined as the summation of the ETX values for all links along the path. The ETX is expressed as:

$$ETX=1/(d_f*d_r)$$

Where $d_f$, $d_r$ represent the forward delivery ratio and reverse delivery ratio, respectively, for a predetermined time interval.

To compute ETX, each node sends broadcast probe packets at a short periodic interval, for example every one second. The probe contains the current transmit sequence number and current received sequence number of probes from each neighbor node.

Since each node broadcasts the probe packets instead of unicasting them, the overhead is substantially reduced. The metric suffers little from self-interference since delays are not measured.

The main disadvantage of this metric is that since broadcast probe packets are sent at the lowest priority, they may not experience the same loss rate as data packets sent at higher priority. Moreover, the metric does not directly account for link load and link bandwidth. So a heavily loaded link may have a very low loss ratio, and two links with different bandwidth may have the same loss rate.

Expected Transmission Time (ETT)

ETT is defined as the expected MAC layer duration for a successful transmission of a packet at a link. The ETT of a path is simply the summation of the ETT of all links along the path. The ETT can be expressed as:

$$ETT=ETX*(S/B)$$

where B is link bandwidth and S is the packet size.

ETT takes bandwidth and loss ratio on each link into account. Because of that, it explicitly accounts for reduction in throughput due to interference among links that operate on the same channel.

The advantage of ETT is it favors short path with high bandwidth, low-loss links. The disadvantage is that it does not take channel diversity into account.

Weighted Cumulative ETT (WCETT)

WCETT is a metric based on ETT; it is designed to take advantage of multi-radio mesh networks. WCETT could increase performance 250% over HOP and 80% over ETX in a two radio (two access point) mesh network.

WCETT is a path-based metric. It is described by the equation given below.

SETT=sum of ETT of links on the path
BG-ETT="Bottleneck group ETT" on the path $$WCETT=(1-\beta)*SETT+\beta*BG\text{-}ETT$$

Where $\beta$ is a tunable parameter. Higher values of $\beta$ gives more preference to channel diversity and lower values of $\beta$ give more preference to shorter paths.

BG-ETT is calculated in three steps. First, links on a path are grouped according to channel. Second, the ETT of all links in each group are added together. Third, the group with the largest sum is determined and is designated as the BG-ETT.

Dynamic Metric Support in Adaptive Wireless Routing (AWR)

ETT is a measure of the expected time needed to successfully transmit a packet of a fixed length, S, on a link. It yields high throughput paths because it selects a path with the least delay. However, ETT is volatile, load-sensitive and emphasizes the impact of link throughput on each hop without considering the network's overall performance. Further, the link quality metrics presently used do not consider the resources, such as CPU usage, and internal packet queuing, consumed by each hop along the routing path.

The present method and system for routing packets incorporates the use of normalized ETT and combinational weighted link quality metrics. Both metrics take the overall network performance into consideration and reduce emphasis on link throughput to an appropriate level.

Normalized ETT

ETT is a load-sensitive parameter and is very volatile. A typical ETT value table is shown in Table 1.

| | ETT VALUE TABLE (micro second) | | | | | | | |
|---|---|---|---|---|---|---|---|---|
| | BANDWIDTH (Mbit/sec) | | | | | | | |
| ETX | 30 | 28 | 25 | 20 | 15.0 | 10.0 | 5.0 | 1.0 |
| 1 | 273.06667 | 292.57143 | 327.68 | 409.6 | 546.13333 | 819.2 | 1638.4 | 8192 |
| 2 | 546.13333 | 585.14286 | 655.36 | 819.2 | 1092.2667 | 1638.4 | 3276.8 | 16384 |
| 3 | 819.2 | 877.71429 | 983.04 | 1228.8 | 1638.4 | 2457.6 | 4915.2 | 24576 |
| 4 | 1092.2667 | 1170.2857 | 1310.72 | 1638.4 | 2184.5333 | 3276.8 | 6553.6 | 32768 |
| 5 | 1365.3333 | 1462.8571 | 1638.4 | 2048 | 2730.6667 | 4096 | 8192 | 40960 |
| 6 | 1638.4 | 1755.4286 | 1966.08 | 2457.6 | 3276.8 | 4915.2 | 9830.4 | 49152 |
| 7 | 1911.4667 | 2048 | 2293.76 | 2867.2 | 3822.9333 | 5734.4 | 11468.8 | 57344 |
| 8 | 2184.5333 | 2340.5714 | 2621.44 | 3276.8 | 4369.0667 | 6553.6 | 13107.2 | 65536 |
| 9 | 2457.6 | 2633.1429 | 2949.12 | 3686.4 | 4915.2 | 7372.8 | 14745.6 | 73728 |
| 10 | 2730.6667 | 2925.7143 | 3276.8 | 4096 | 5461.3333 | 8192 | 16384 | 81920 |
| 20 | 5461.3333 | 5851.4286 | 6553.6 | 8192 | 10922.667 | 16384 | 32768 | 163840 |
| 30 | 8192 | 8777.1429 | 9830.4 | 12288 | 16384 | 24576 | 49152 | 245760 |
| 40 | 10922.667 | 11702.857 | 13107.2 | 16384 | 21845.333 | 32768 | 65536 | 327680 |
| 50 | 13653.333 | 14628.571 | 16384 | 20480 | 27306.667 | 40960 | 81920 | 409600 |
| 60 | 16384 | 17554.286 | 19660.8 | 24576 | 32768 | 49152 | 98304 | 491520 |

As can be seen in Table 1 above, values for ETT can vary over three orders of magnitude. This excessive volatility can cause route fluctuation. According to one embodiment, in order to reduce route fluctuation, the ETT value is normalized to a value between 10 and 100.

This is done by regression analysis and curve fitting. As shown in FIG. 1, an exponential function is used as the regression model to obtain normalized ETT values.

Compared to regular ETT, the effect of normalized ETT is that the effective path length is reduced. For example, consider two paths. One path is one hop away and with link throughput of 1 Mbit/sec. The ETT of the path is 8192. The other path is ten hops away and with link throughput of 10 Mbit/sec. The ETT of each hop is 819. So with regular ETT, a path with ten 10 Mbit/sec hops has the same metric of a path with one 1 Mbit/sec hop. However, with normalized ETT, in the same scenario, a path with one 1 Mbit/sec hop has a normalized ETT metric of 95, which is about equivalent to three 10 Mbit/sec hops which have a normalized ETT metric of 35 each. So, with normalized ETT, a path with four 10 Mbit/sec hops is not considered superior to a path with one 1 Mbit/sec hop.

Combinational Weighted Link Quality Metric

For regular ETT, the throughput is inversely proportional to ETT. Hence, the effect of link throughput could be exaggerated and it can cause excessive route fluctuation. The effect of link throughput should be normalized and superimposed to the link metric. The Combinational Weighted Link Quality Metric (CW-Metric) can be expressed as:

$$CW\text{-Metric} = \alpha * ETX + \beta * (MAX\_EFFECTIVE\_LINK\_THROUGHPUT/B)$$

Where $\alpha + \beta = 10$. The MAX_EFFECTIVE_LINK_THROUGHPUT is the maximum effective link throughput with units of 100 Kbit/sec. The default value of $\alpha$ is 6 and $\beta$ is 4.

For example, assume the ETX is one. With this proposed metric, in the same scenario as described above, a path with one 1 Mbit/sec hop has a combinational metric of 86. The other path with six 10 Mbit/sec hops has a path metric of 84, with a combinational metric of 14 on each hop.

The effect of the present combinational weighted link quality metric is similar to a normalized ETT. The link metric is normalized to a minimum value of 10. Under most conditions, normalized ETT is not as volatile as absolute ETT. However, combinational metrics can be volatile when throughput (B) is less than 100 Kbit/sec or if ETX is a large value. A minimum link throughput may be set to be 100 Kbit/sec and maximum per hop ETX to be 20, about 80% loss ratio on both directions, to prevent this situation. Ideally the weight of ETX and link throughput should be in the same order inside the combinational weighted link quality metric.

Moving Average

For each measured link capacity and ETX value, the sample data is analyzed over a specified period of time. There are two kinds of moving averages, which are now briefly described.

Simple Moving Average (SMA)

A simple moving average ("SMA") is formed by computing the average (mean) value of a set of samples over a specified number of periods. When new samples arrive, old samples not within the specified number of periods are dropped. A simple moving average is a lagging indicator and will be always "behind" the sample data. They fit in the category of trend following indicators. When sample data follows a trend, moving averages work well. However, when sample data does not follow a trend, moving averages can be misleading.

Exponential Moving Average (EMA)

In order to reduce the lag in simple moving averages, exponential moving averages ("EMAs") (also called exponentially weighted moving averages) are used. EMAs reduce the lag by applying more weight to recent sample data relative to older sample data. The weighting applied to the most recent sample data depends on the specified multiplier of the moving average. The larger the EMA's multiplier, the more weight will be applied to the most recent sample data.

EMA is used for shorter time periods to capture changes more quickly, while SMA is used over longer time periods to identify long-term trend changes. This is a trade-off between sensitivity and reliability. The more sensitive an indicator is, the more signals will be given. These signals may prove timely, but with increased sensitivity comes an increase in false signals. The less sensitive an indicator is, the fewer signals are given. However, less sensitivity leads to fewer and more reliable signals, but these signals can be late as well.

The Length of Periods to be Used in a Moving Average

Because moving averages follow a trend, they work best when samples follow the trend, but are ineffective when samples move in a range. The length of a period to be used in a moving average varies according to the samples' volatility and "trendiness." The more volatility there is, the more smoothing is required and hence the longer the period of time required to calculate a representative moving average.

Computing Delivery Ratio

To calculate ETX, the forward and reverse delivery ratio ($d_f$ and $d_r$) of each link is determined. Each node sends out a broadcast probe packet at a short periodic interval (for example, 1 second). Broadcast packets are not retransmitted by the 802.11 MAC layer. Nodes track the number of probes received from each neighbor and include this information in their own probes. Each probe contains the current sent sequence number and the last received sequence number from each neighbor node. At periodic intervals, for example, every 60 seconds, an EMA delivery ratio is calculated. However, when a new neighbor is discovered, the delivery ratio cannot be calculated before the first periodic interval (for example, 60 seconds) has elapsed. According to the invention, the delivery ratio will be set to 100% for the duration of the first periodic interval (for example, for the first 60 seconds).

Computing Link Bandwidth

The link bandwidth, B is determined using feedback from the radio driver. According to the invention, in one embodiment, the feedback interval is preferably set at five seconds. When the radio driver does not provide rate feedback, a packet-pair method is used to estimate the bandwidth. In one embodiment of the packet-pair method, one small size packet, (for example, 100 bytes) and a large size packet, (for example, 1800 bytes) are sent back-to-back at a periodic interval of, for example, five seconds for a period of, for example, five minutes in both directions of the link). As soon as the smaller size packet is received, a timer is started to measure the delay incurred in receiving the larger packet.

Every five minutes, the available Link Bandwidth is calculated. The process is as follows according to one embodiment:
1. A moving average bandwidth is calculated from a sample of 60 Packet-Pair bandwidth measurements. The process is as follows according to one embodiment:
   a. Take the average of a packet-pair bandwidth measurement 5, 10, 15, 20, 25, 30, 35, 40, 45, 50, 55 of the sample as the initial value of the exponential moving average.
   b. Calculate the exponential moving average of bandwidth of the sample.
      I. If the difference between the bandwidth measurement and initial exponential moving average (from a) exceeds 50% of the initial value of the exponential moving average, then $\alpha$ is set to 0.1.
      II. If the difference between the bandwidth measurement and initial exponential moving average (from a) is within 50% of the initial value of the exponential moving average, then $\alpha$ is set to 0.2.
      III. the formula is: new moving average bandwidth=(1−$\alpha$)*old moving average bandwidth+$\alpha$*measurement.
2. Calculate available link bandwidth. The process is as follows according to one embodiment.
   a. new available link bandwidth=(1−$\alpha$)*old available link bandwidth+$\alpha$*moving average bandwidth of a sample.
   b. where $\alpha$=0.9

However, when a new neighbor node is discovered, the available link bandwidth is set to 100% of the maximum effective link throughput of the link. In one embodiment, this is 20,000 Mbps.

According to one embodiment, ETX measures the loss rate of broadcast packets between pairs of neighboring nodes. ETX probe packets are sent out at a very slow rate (usually 1/sec). Since broadcast packets do not have any reliability mechanism, broadcast packets are sent out with the lowest fixed modulation transmission rate. Hence, ETX may not experience the same loss rate as data packets sent at a higher rate. For a 802.11b network, ETX works well since the variation in data transmission rate (1 Mbps-11 Mbps) due to the effect of auto-rate fallback (ARF) algorithm is not significant in this case. However, when the transmission rates are much higher (e.g. up to 54 Mb/sec with 802.11a/g, and greater than 100 Mb/sec with 802.11n), ETX using broadcast packets might not work well if the ARF algorithms are implemented in the WLAN chipsets. In another embodiment, the following adjustments are made:

With an auto-rate adaptation algorithm built inside certain MAC layer chipsets, the effect of loss rate is already reflected in the available link bandwidth itself. Accordingly, the ETX is set to a constant value if using the normalized ETT metric or $\alpha$ is set to zero and $\beta$ is set to 1 if the combinational weighted link quality metric is used.

Wireless Hello Protocol

A wireless hello protocol (WHP) serves the following purposes according to one embodiment:
1. Neighbor Discovery.
2. Neighbor Failure Detection.
3. Unidirectional Link Detection
4. Per Hop Delivery Ratio Calculation.
5. Per Hop Link Bandwidth Calculation A wireless hello packet reports the delta change on the link or neighbor status. It accommodates packet loss in an unreliable wireless network. Also, it provides a framework to allow a user to add more functionalities into the wireless hello protocol, such as a dynamic metric calculation.

A wireless hello packet is sent out as an IP broadcast packet. A well known port 655 is allocated for transmitting the wireless hello protocol packet.

Neighbor State

Figure 2:
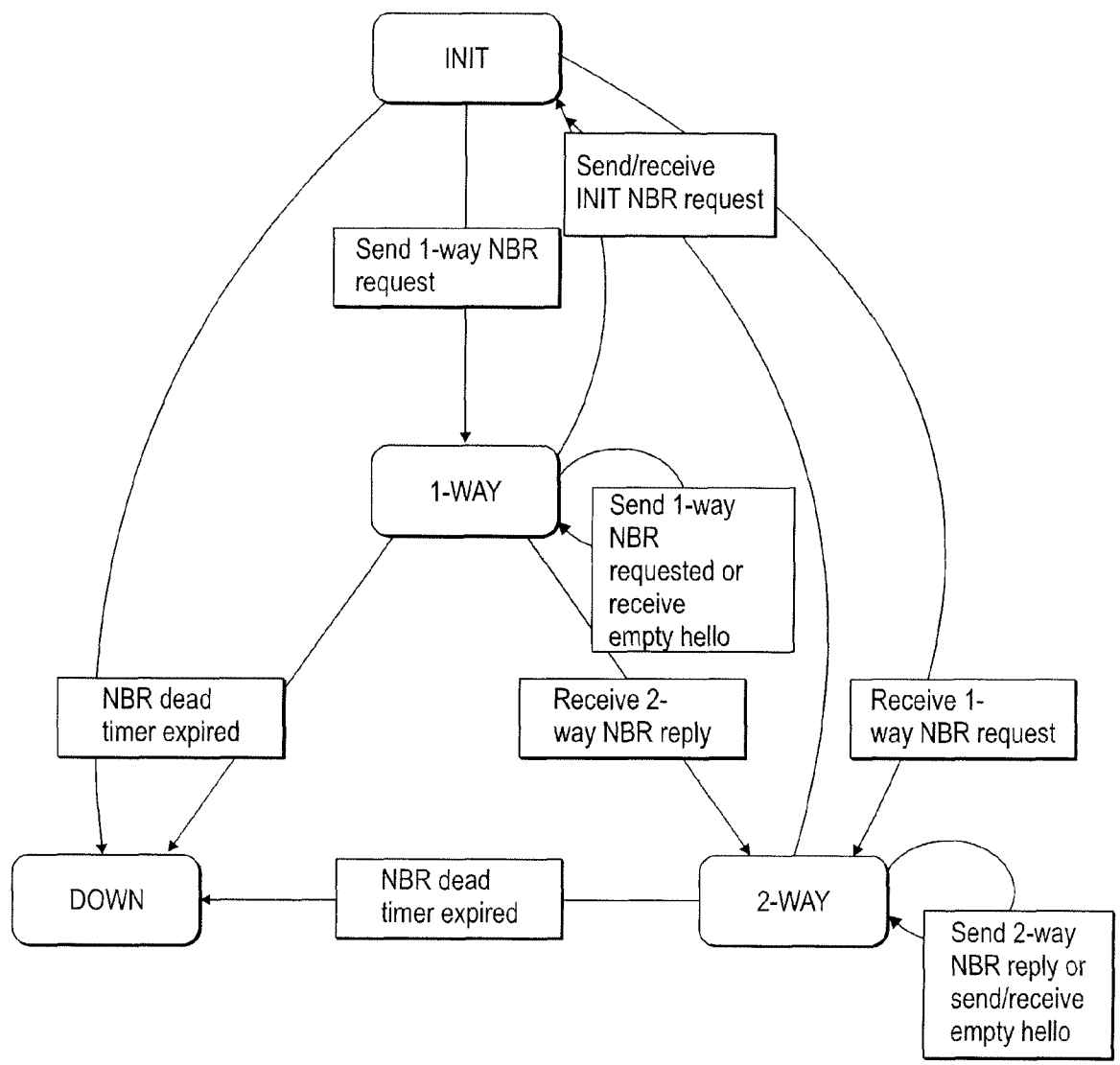
FIG. 2 illustrates a wireless hello packet state transition diagram, according to the present invention.

FIG. 2 illustrates a wireless hello packet state transition diagram, according to one embodiment of the present invention. There are four states defined for each neighbor: INIT, 1-WAY, 2-WAY and DOWN. "TLV" represents information stored in a database having three parameters: time-length-value.

INIT
  Once a Hello message is received from a new neighbor, an associated neighbor data structure is created and the neighbor state is initialized to INIT. When an adjacent neighbor is reset (by sending/receiving an initialize neighbor message explicitly or by loss of a high number of consecutive Hello packets, (30, for example) or receiving unexpected state information, the neighbor state is also reset to INIT state.

1-WAY
  A Hello message has been received from the neighbor, in which the router has not been mentioned in a 1-WAY neighbor message. This indicates that communication with the neighbor is not bidirectional.

2-WAY
  In this state, communication between the two routers is bidirectional. This is the most advanced state of neighbor adjacency. After this state is reached, the routing protocol can start sending/receiving protocol update packets.

DOWN
  When Hello packets are not received from a neighbor for a period of time (for example, 30 seconds), the associated neighbor dead timer is expired. The neighbor data structure is purged.

Neighbor Discovery (ND)

A neighbor is implicitly defined in the wireless hello packet source address. If a wireless hello packet and the interface receiving the packet are in a different subnet, the packet is ignored. Otherwise, a neighbor structure is created if it does not already exist. Wireless hello packets are sent at a short periodic interval, for example every second, except in one case of link bandwidth calculation.

Each wireless hello packet contains multiple TLVs. There are three TLVs related to neighbor discovery ("ND"):
  1-WAY Neighbor Request (1_WAY_NBR)
  2-WAY Neighbor Reply (2_WAY_NBR)
  INIT Neighbor Request (INIT_NBR)

When a node i changes the state of a link at node j, node i includes the neighbor j address in one of these TLVs in at most 30 consecutive Hello packets sent on the interface. This ensures that node j either receives one Hello packet, or node j misses 30 Hello packets from node i and declares the neighbor adjacency to node i is lost by including neighbor i address in the INIT_NBR TLV on its hello packet sent to node i. A link down event against the neighbor address i is triggered.

When a wireless hello packet is received, if the packet is received from an unknown neighbor, the associated neighbor data structure is created and its neighbor state is initialized to INIT state. It then includes the newly created neighbor in 1_WAY_NBR TLV on its hello packet to that neighbor and advances the neighbor state to 1-WAY. Once it receives a hello packet from that neighbor that contains 2_WAY_NBR TLV and its address is listed in the TLV, it advances the neighbor state to 2-WAY state. 2-WAY state is the most advanced state in an adjacency. AWR can only process a routing update from a neighbor which is in the 2-WAY state.

Neighbor Failure Detection (NFD)

Once a router receives a wireless hello packet from a neighbor within a certain time, for example, 30 seconds, the neighbor's dead timer is reset. Once a neighbor's dead timer is expired, the neighbor state is changed to DOWN state and the neighbor data structure is purged.

Per Hop Delivery Ratio Calculation

Wireless hello packets contain an estimated transmission count ("ETX") TLV. The ETX TLV contains a current transmit sequence number, a current receive sequence number, and a current forward delivery ratio. The transmit sequence number is incremented by one for each ETX TLV transmitted. The current transmit sequence number is set to 1.

Per Hop Bandwidth Calculation

There is a per neighbor PKTPAIR timer. When the timer expires, a pair of wireless hello packets are sent to an associated neighbor. This pair of wireless hello packets contains either one of two types of TLV, a small size (for example, 100 bytes) packet (PKTPAIR_1) or a large size (for example, 1800 bytes) packet (PKTPAIR_2). If a wireless hello packet containing the large size packet TLV is received without the small size packet TLV before it, the large size packet TLV is ignored. The small size packet TLV and the large size packet TLV contain a cyclic sequence number which is in a range between 1 and 60.

Once link bandwidth is measured, the PKTPAIR_REPLY TLV contains the sequence number and the measured bandwidth in Kbit/sec.

Wireless Hello Protocol Packet

Figure 3:
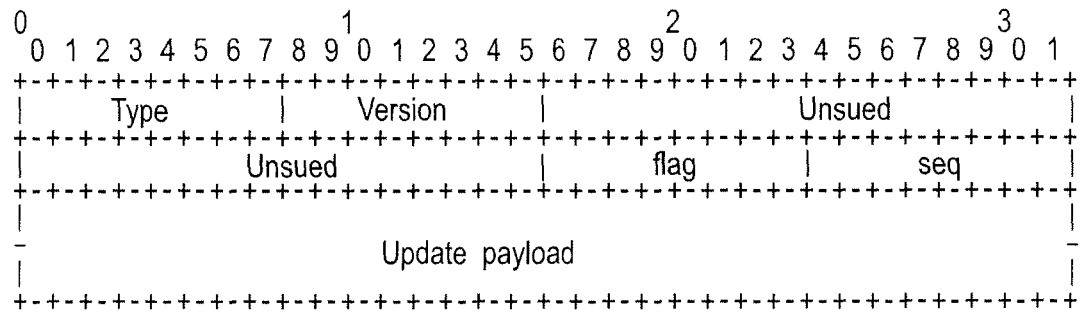
FIG. 3 illustrates an exemplary wireless hello packet 300, according to one embodiment of the present invention.

The packet has 32-bit AWR header followed by 32-bit wireless hello PACKET header and a payload of variable length. The payload consists of various types of TLVs. FIG. 3 illustrates an exemplary wireless hello packet according to one embodiment of the present invention. Wireless hello packet 300 includes the following information:
version: The current adaptive wireless routing version number.
type: Hello code point is 3.
seq: Hello packet sequence space. It is a cyclic sequence number in the range of [0 . . . 255].
flag: This four bit flag field is defined as,

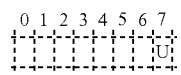

U: uncheck sequence number

Figure 4:
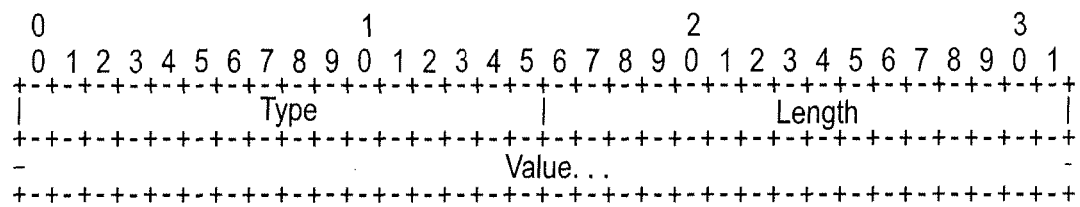
FIG. 4 illustrates an exemplary information packet 400, according to one embodiment of the present invention.
Figures 5, 6:
FIG. 5 illustrates seven information code points for value fields, according to one embodiment of the present invention.
FIG. 6 illustrates an exemplary 1-way Neighbor Request packet 600, according to one embodiment of the present invention.

FIG. 4 illustrates an exemplary TLV packet 400, according to one embodiment of the present invention. TLV packet 400 includes type, length and value fields. FIG. 5 illustrates seven TLV code points for value fields, according to one embodiment of the present invention. The code points include 1_WAY_NBR, 2_WAY_NBR, INIT_NBR, ETX, PKTPAIR_1, PKTPAIR_2, and PKTPAIR_Reply.

FIG. 6 illustrates an exemplary 1-way Neighbor Request packet 600, according to one embodiment of the present invention. 1-way Neighbor Request packet 600 includes neighbor addresses. The value n is the number of neighbor entries in the TLV.

FIG. 7 illustrates an exemplary 2-way Neighbor Reply packet 700, according to one embodiment of the present invention. 2-way Neighbor Reply packet 700 includes neighbor addresses. The value n is the number of neighbor entries in the TLV. The first 16 bits indicate that packet 700 is a 2-way Neighbor Reply packet.

FIG. 8 illustrates an exemplary INIT Neighbor Request packet 800, according to one embodiment of the present invention. INIT Neighbor Request packet 800 includes neighbor addresses. The value n is the number of neighbor entries in the TLV. The first 16 bits indicate that packet 800 is an Initial Neighbor Request packet.

Figure 9:
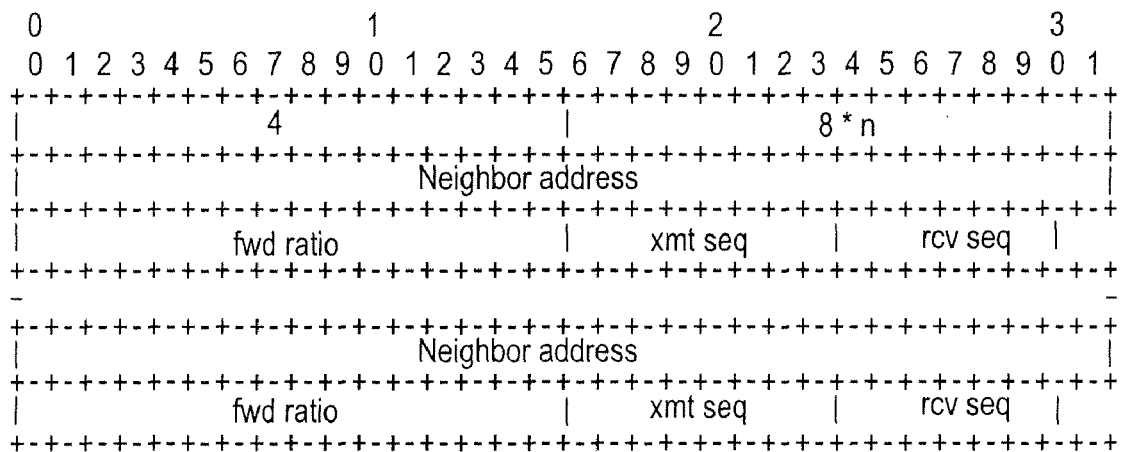
FIG. 9 illustrates an exemplary estimated transmission count (ETX) information packet 900, according to one embodiment of the present invention.

FIG. 9 illustrates an exemplary ETX TLV packet 900, according to one embodiment of the present invention. ETX TLV packet 900 includes the following fields and values:
n: number of neighbor entries in the TLV.
Neighbor address: associated Neighbor ETX metric information.
fwd ratio: The current forward delivery ratio.
xmt seq: ETX probe transmit sequence number.
rcv seq: the last received sequence number.

Figure 10:
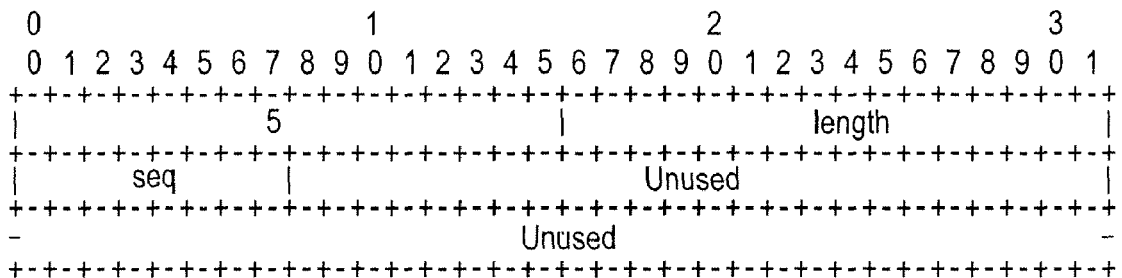
FIG. 10 illustrates an exemplary small size packet 1000 used to measure the delay between a pair of back-to-back unicast probes to a neighboring node, according to one embodiment of the present invention.

FIG. 10 illustrates an exemplary PKTPAIR_1 TLV packet 1000, according to one embodiment of the present invention. PKTPAIR_1TLV packet 1000 includes the following fields and values:
seq: The current PacketPair sequence number.
length: The TLV length is preferably 100 bytes.

Figure 11:
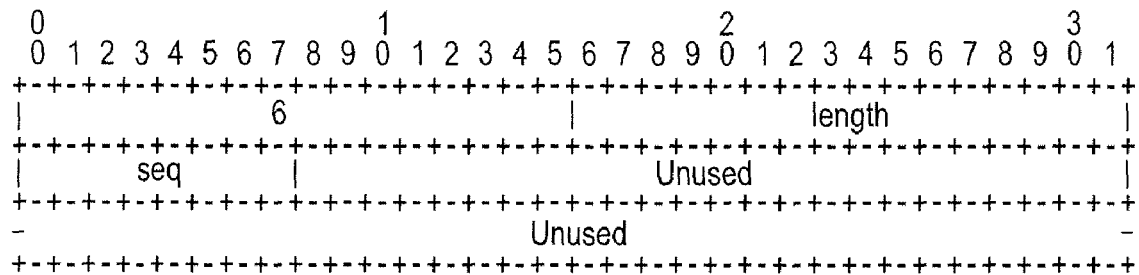
FIG. 11 illustrates an exemplary large size packet 1100 used to measure the delay between a pair of back-to-back unicast probes to a neighboring node, according to one embodiment of the present invention.

FIG. 11 illustrates an exemplary PKTPAIR_2 TLV packet 1100, according to one embodiment of the present invention. PKTPAIR_2 TLV packet 1100 includes the following fields and values:
seq: The current PacketPair sequence number.
length: The TLV length is preferably 1800 bytes.

Figure 12:
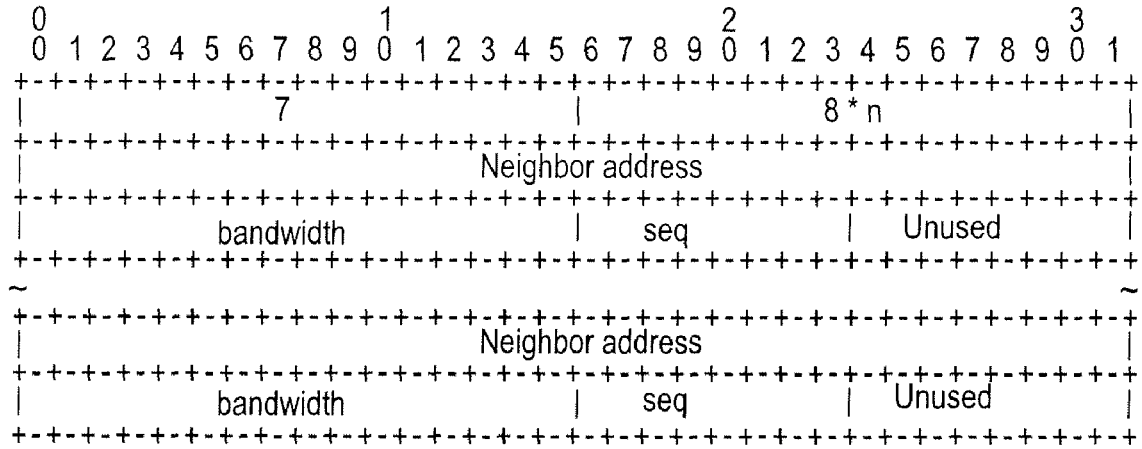
FIG. 12 illustrates an exemplary information packet 1200, containing neighbor PacketPair information and PacketPair sequence number, according to one embodiment of the present invention.

FIG. 12 illustrates an exemplary PKTPAIR_REPLY TLV packet 1200, according to one embodiment of the present invention. PKTPAIR_REPLY TLV packet 1200 includes the following fields and values:
n: number of neighbor entries in the TLV.
Neighbor address: associated Neighbor PacketPair information.
bandwidth: Effective link throughput in Kbit/sec.
seq: The PacketPair sequence number referred to by this reply TLV.

A method and system for a dynamic metric and wireless hello packet for use in a mesh network have been disclosed. Although the present methods and systems have been described with respect to specific examples and subsystems, it will be apparent to those of ordinary skill in the art that it is not limited to these specific examples or subsystems but extends to other embodiments as well.

We claim:
1. A computer-implemented method, comprising:
identifying a first routing path of two or more routing paths for a packet to travel from a first node to a second node through a mesh network, wherein the first node receives a link status of the second node through the first routing path;

estimating a first time period needed to transmit the packet via the first routing path;

identifying a second routing path of the two or more routing paths, wherein the first node receives the link status of the second node through the second routing path;

estimating a second time period needed to transmit the packet via the second routing path;

normalizing the first and the second time periods by a regression analysis to generate a first and a second normalized expected transmission time (normalized ETT) value, wherein the regression analysis generates the first and the second normalized ETT values using an exponential function as the regression model;

comparing the first normalized ETT value with the second normalized ETT value;

determining a routing path as the one of the first routing path and the second routing path with the lower of the first normalized ETT value and the second normalized ETT value; and transmitting the packet to the second node through the routing path.

2. The computer-implemented method of claim 1, wherein a wireless mesh router calculates the route.

3. The computer-implemented method of claim 2, wherein the wireless mesh router supports an 802.11 standard.

4. The computer-implemented method of claim 1, further comprising estimating a processor usage value of an intermediary node through which the packet passes.

5. The computer-implemented method of claim 1, further comprising compensating for internal packet queuing.

6. A computer-implemented method, comprising:

identifying a first routing path of two or more routing paths for a packet to travel from a first node to a second node through a mesh network, wherein the first node receives a link status of the second node through the first routing path;

estimating a first maximum effective throughput used to transmit the packet via the first routing path;

identifying a second routing path of the two or more routing paths, wherein the first node receives the link status of the second node through the second routing path;

estimating a second maximum effective throughput used to transmit the packet via the second routing path;

normalizing the first and the second maximum effective throughputs by a regression analysis to generate a first and a second normalized maximum effective throughput value, wherein the regression analysis generates the first and the second normalized effective throughput values using an exponential function as the regression model;

comparing the first normalized effective throughput value with the second normalized effective throughput value;

determining a routing path as the one of the first routing path and the second routing path with the lower of the first normalized effective throughput value and the second normalized effective throughput value; and transmitting the packet to the second node through the routing path.

7. The computer-implemented method of claim 6, wherein a wireless mesh router calculates the route.

8. The computer-implemented method of claim 7, wherein the wireless mesh router supports an 802.11 standard.

9. The computer-implemented method of claim 6, further comprising estimating a processor usage value of an intermediary node through which the packet passes.

10. The computer-implemented method of claim 6, further comprising compensating for internal packet queuing.

11. The computer-implemented method of claim 1, wherein the link status is received via a wireless hello protocol.

12. The computer-implemented method of claim 6, wherein the regression analysis uses a weight function that receives as inputs an expected transmission count and the maximum effective throughput.

13. The computer-implemented method of claim 6, wherein the link status is received via a wireless hello protocol.

* * * * *